RECORD SENSING MECHANISM

Filed April 16, 1954 5 Sheets-Sheet 1

May 10, 1960 A. H. DICKINSON 2,936,112

RECORD SENSING MECHANISM

Filed April 16, 1954 5 Sheets-Sheet 3

May 10, 1960 A. H. DICKINSON 2,936,112

RECORD SENSING MECHANISM

Filed April 16, 1954 5 Sheets-Sheet 4

United States Patent Office 2,936,112

Patented May 10, 1960

2,936,112

RECORD SENSING MECHANISM

Arthur H. Dickinson, Greenwich, Conn., assignor to International Business Machines Corporation, New York, N.Y., a corporation of New York Application April 16, 1954, Serial No. 423,774

10 Claims. (Cl. 235—61.11)

In the class of machine popularly known as "business" machines, cards are employed upon which data are registered, usually by perforations placed at different locations in the cards, the location of the perforations in the cards with respect to one or more of the edges of the card being the differentiating characteristic whereby the information registered on the card may be utilized by the machine for accounting, computing, recording or other purposes. The conventional card as now employed in such machines has the perforations arranged in columns parallel with the short dimension of the card, the perforations in each column being spaced from one of the longer edges of the card the proper distance for the perforations to register the desired value. Perforated cards such as described are also used in electronic computing machines so that, although the computations performed by such machines are relatively instantaneous, their capacity is limited by the rate at which the cards can be fed through the machine.

Cards capable of retaining magnetic recordings have also been used, the discrete magnetized areas being located at selected positions in the columns in the same manner as the perforations.

In utilizing these cards in machines of the kind described, the cards are fed continuously through the machine in a direction parallel with the short dimension of the card past sensing coils which take account of the position of the perforation or magnetized area in the column with respect to the card feed cycle, the elapsed time between the passage of the perforation or magnetized area past the sensing coils and the end of that cycle constituting the factor which determines the number of impulses which are conveyed to the computing section of the machine. With such machines the capacity of the card is limited to the number of columns which the card can contain. Ordinarily some of the columns are used for designating the nature of the numerical data recorded in the remaining columns of the card, so that the actual number of numerical values recorded on each card is slightly less than the number of columns.

The object of the present invention is to provide a new method of registering numerical values or other data on a card or other recording medium and using such data in machines of the class described in such manner that each separate record on the card, regardless of its position in the column, constitutes a complete record of a predetermined value to be fed into the computing section of the machine, whereby the capacity of the card is not limited to the number of columns which may be provided on a single card, but instead each card will have a capacity equal to the number of insignia which may be placed on the card sufficiently spaced from each other to individually effect the operation of the sensing mechanism. Thus cards having eighty columns with twelve separate positions in each column will have a capacity of recording twelve times eighty separate values.

Otherwise stated, instead of the passage of each card effecting a single complete operational cycle of the machine, such operation is effected by the passage of a single row of insignia on the card, and assuming the same speed of movement of the cards through the machine, the work done by the machine in the same period of operation is increased twelve fold.

In this application I have disclosed my improved method of operation as carried out by an electronic computing machine wherein magnetizable cards such as described in U.S. Patent No. 2,254,931 are employed. Instead, however, of representing the recorded numerical values by the positions of the magnetized areas in the columns on the cards as described in said patent, each magnetized area in itself represents a predetermined value regardless of its location on the card. These differently magnetized areas are produced by subjecting the card in the recording apparatus to the action of recording heads wherein the impressed voltage is caused to build up to a maximum during the recording operation at a different rate for each different numerical value or digit. As the cards are fed through the recording machine at a uniform speed and as the total recording time is the same regardless of the rate of voltage increase, the magnetic recordings produced in the cards are different for each digit and effect different responses in the computing machine corresponding in value with the differences in the rate of voltage increase.

My improved method of operation may also be employed with computing machines wherein the recorded data are in the form of photographically produced images differing from each other in accordance with variations in the rate of change in the quantity of the light impinging on a light sensitive pick-up cell, as will be later described.

Various types of I.B.M. electronic accounting, tabulating and computing machines now in use may readily be modified to operate in accordance with my new method, and in the accompanying specification I have described my invention as applied to a machine generally designated as a computing machine.

Such machines comprise a card feeding mechanism which feeds the cards continuously past a sensing head having a separate pick-up coil for each column of recordings on the card. These pick-up coils are responsive to the recordings in the cards. For carrying out my new method of operation, magnetic pick-ups are employed of a type wherein the A.C. voltage across the pick-up coil is a reproduction of the voltage impressed on the recording head in producing the magnetic recordings in the card. Such pick-up mechanism are old per se and are employed in magnetic sound recording apparatus such, for example, as described in "Magnetic Tape Recording" by A. C. Shaney.

The voltage or current induced in the pick-up circuit by the passage of the magnetized area of the card increases at the rate corresponding with the rate of increase of the voltage impressed on the card in making the recording until a predetermined maximum is reached and then remains at the maximum value for the balance of the interval of passage of the magnetized area past the pick-up coil.

The above-mentioned I.B.M. computing machines using perforated cards utilize electronic register orders which are differentially responsive to the numerical values represented by the location of the recording in the column. These numerical values may be represented by the number of uniform timed impulses transmitted to a register order during a complete card cycle. In machines utilizing punched cards the operation of a register order is initiated by a trigger circuit at a predetermined point in the card feed cycle, and the connection of a register order to the source of impulses is controlled by the trigger circuit released by the passage of the perforations in the cards across the sensing positions. Hence, the number of impulses transmitted to a register order is equal to the total number of impulses generated during the complete cycle less the number generated during the passage of the portion of the card between the beginning of the cycle and the passage of the perforations.

In the machine as modified for carrying out my improved method of operation the trigger circuit for initiating the operation of the commutator is responsive to the voltage induced by the low voltage impressed on the card by the recording head at the beginning of the recording and the commutator completes its cycle of operation in a time interval equal to the time of passage of the magnetized area of the recording past the pick-up coil. The trigger circuit through which the commutator circuit is connected to the computing sections of the machine is adjusted to respond to a voltage in the pick-up circuit corresponding to near the maximum voltage impressed by the recording head at the end of the period of increasing voltage, and the number of impulses transmitted to the computing section of the machine is thus equal to the number of impulses generated during a complete cycle of commutator operation less the number generated in the period of increasing voltage.

The I.B.M. electronic computing machines for punched cards usually have two sensing heads, one in advance of the other, the first sensing head picking up the data in the columns containing the grouping insignia and such other presetting insignia as may be required for the proper operation of the computing section when the perforations or other recordings of numerical values on the cards are picked up by the sensing head. For example, it is customary to have in one column of the card a recording which determines whether the digits next supplied to the computing section will be added to or subtracted from the previously accumulated totals. In modifying a machine of this type to utilize my improved method of data recording I may also use two rows of sensing heads spaced apart in the direction of the card feed so that the recordings in the portion of the card designating the grouping and for effecting the presetting of the computing section will be "sensed" before the recordings designating the digits initiate the operations in their respective circuits.

My novel method of representing different values for recording purposes by recording such values by symbols capable of generating responsive forces at different rates of increasing intensity may also be employed by photographic means. That is to say, photographic images may be produced on a film or other suitable record from which a response of increasing intensity varying in rate of increase is employed to produce correspondingly different responses in a photo electric cell, and I have disclosed herein a method of utilizing such images in an electronic computing machine of the character referred to above.

My invention will be understood from the following description and accompanying drawings wherein:

Fig. 1 shows a portion of a card with magnetic recordings indicated by outlines illustrating the envolopes of the impressed voltages;

Fig. 2 similarly illustrates the magnetic recordings for each digit on an enlarged scale;

Fig. 6 is a length of film showing photographic recordings such as employed in the modified procedure above referred to;

Fig. 7 is a schematic view of the optical system employed for generating from the images on the film differentially increasing voltages in the pick-up circuits of the computing machine;

Figs. 8 and 9 show details of the system; and

Fig. 10 is a wiring diagram showing the pick-up circuits as modified to respond to the images on the film.

Figure 1:
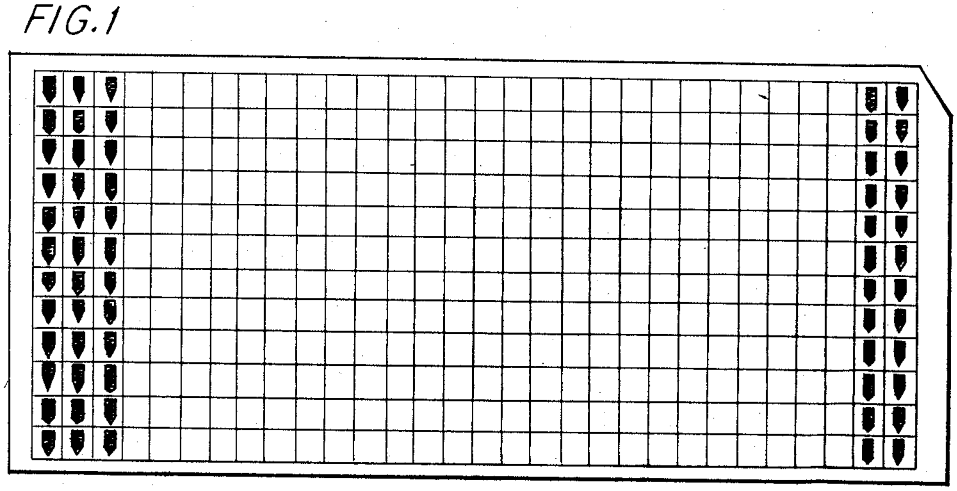

Referring to the drawings, 1 indicates the card feed which continuously feeds the cards past the two rows of sensing heads 2 and 3, respectively. The sensing heads are connected to the "analyzer section" of the computing machine which has one or more complete group of analyzing instrumentalities for each column on the card. There is also in the analyzing section for each column on the card a "high voltage" trigger for controlling the "gate" through which the successive impulses measuring the digit recorded on the card are transmitted to the computing and printing sections of the machine. The machine has also the usual "impulse generator" and "commutator" for making available a predetermined number of impulses for each recording cycle or "machine point."

The commutator is a 9-stage commutator of standard construction and its operation is initiated by a low voltage trigger assembly which is connected to the analyzer sections of all the sensing coils in a single row. This trigger assembly, as will be later described, embodies a starting trigger "Z" which is shifted to "On" position by the low voltage developed in the sensing coils at the beginning of the recording period. The sequence of operations performed during the passage of one recorded digit "7" is illustrated in the timing chart, Fig. 5. Energization of the starting trigger "Z" causes two other triggers "Y" and "W" to shift to "On" position. The "Y" trigger controls a "leveler" circuit which corrects for inaccuracies in the alignment of the cards and discrepancies in the positioning of the symbols, as will be later described, and the "W" trigger initiates the operation of the commutator cycle. During the "9" stage of the commutator, see Fig. 5, an "X" trigger connects the commutator circuit to a common feed wire for the computing sections associated with the analyzer sections of all the sensing coils in one row. The "high voltage" trigger of each analyzer section controls the transmission of the impulses from the commutator circuit to its computing instrumentalities. These high voltage triggers, "236" in the timing diagram, shift from "Off" to "On" position at different times, depending upon the rate of increasing voltage impressed on the sensing head of that particular section by the magnetic recording in the corresponding column of the card. Thus the impulses received by the several computing sections are determined by the rates of increasing voltage applied in making the magnetic recordings on the card.

In the computing and printing sections of the machine there are the usual computing instrumentalities which are interconnected in the usual manner to effect the carryover, total printing and other operations upon the reception of impulses as thus controlled by the analyzing section.

In an application of Arthur H. Dickinson filed concurrently herewith there is disclosed a machine for making on the cards the magnetic recordings used in carrying out my improved method. Such magnetic recordings are made simultaneously in all the columns of the card where data are recorded, the recording interval being maintained uniform and also the speed of movement of the card, so that the dimension of the magnetized area of the card in a line with the direction of movement of the card, that is, the short dimension of the card, is always the same. The voltage impressed on the recording heads is increased from zero to maximum at a different rate for each digit recorded. Thus, in Fig. 2 the period wherein an increasing voltage is impressed on the recording heads is represented by the portion of the symbol wherein the transverse dimension of the symbol is increased at different rates. Hence when the rate of increase in voltage is the smallest, as for the digit "0" the time required for the voltage to be built up to the desired maximum is the longest. With each succeeding digit the period of increasing voltage is shorter and the period of maximum impressed voltage is longer.

One upper coil and one lower coil are usually provided for each column of the card so that the number of columns for the recordings designating the grouping, etc. and the number of columns containing the recordings of the numerical values to be applied to totals previously accumulated in the machine may be modified by varying the connections of the sensing coils to the comparing and computing sections of the machine. Several of the sensing coils in both rows are utilized for sensing the recordings designating the grouping. These recordings in the usual manner determine the disposition to be made of the recorded numerical values. For example, if the digits representing the grouping on the card being fed past the upper sensing coils are the same as the digits representing the grouping on the preceding card, which is sensed at the same time by the lower coils, the numerical values transmitted to the computing section by the sensing coils in the second row will be applied to the previously accumulated totals. If, however, the grouping is not the same on the two cards, the card feed will be stopped when the final row on the first card has been sensed and the printing mechanism will be energized to print the accumulated totals and reset the computing instrumentalities of the columns printed at zero.

Figures 2, 3:
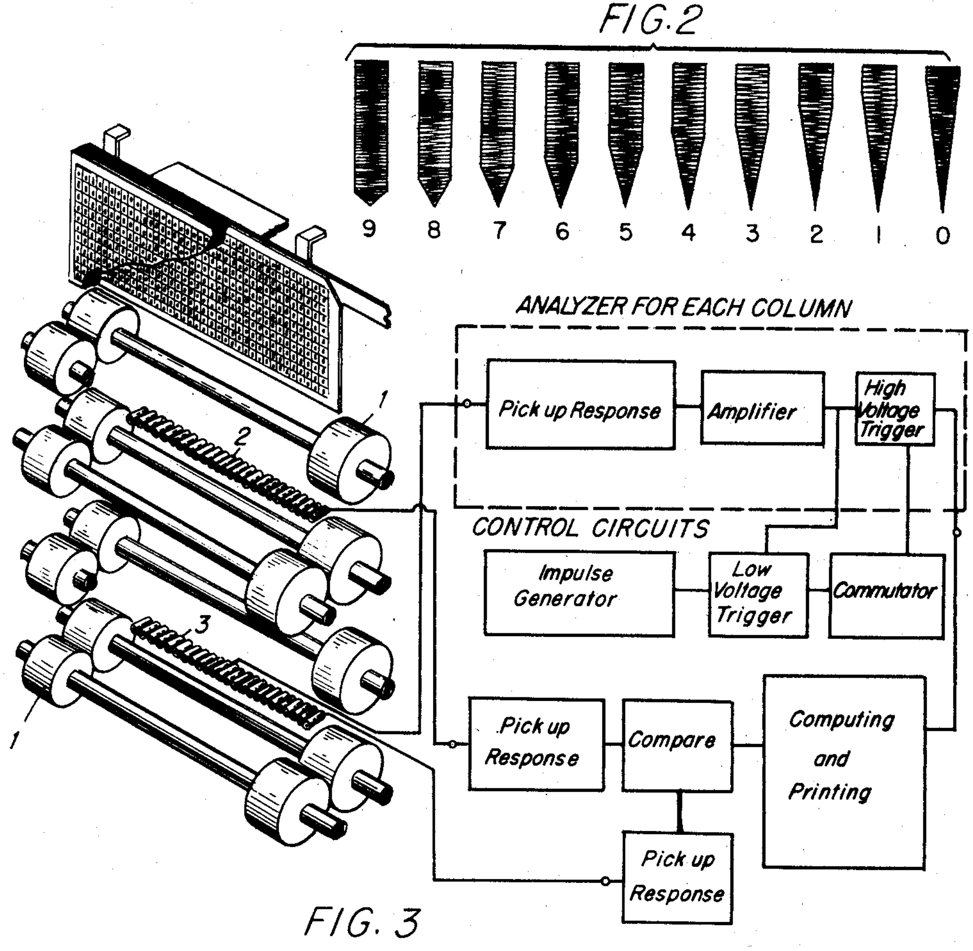
Fig. 3 is a schematic view showing the various sections of the computing machine as modified to operate in accordance with my improved method.

As shown in Fig. 3, the two rows of sensing coils are separated by a distance equal to the width of the card plus the distance between two cards so that the same rows in the two cards will be simultaneously "sensed" by the coils in the two rows respectively. This positioning of the sensing coils is the same as in the I.B.M. machines above mentioned, using perforated cards, and is required in those machines so that all the digits in the columns of the second card representing the "grouping" will be "sensed" and transmitted to the comparing instrumentalities of the machine a sufficient time before the perforations representing numerical values to be transmitted to the register orders reach the sensing coils of the second row, to allow for a "total print" operation in case the recordings on the second card representing the "grouping" are different from those on the first card.

In carrying out my new method of operation I may use the same grouping response to which end the data will be so recorded on the cards that there will be no change in the recordings representing the "grouping" on any one card. That is to say, whenever in the preparation of the cards, as, for example, in the machine disclosed in my co-pending application above referred to, a change in the recordings indicating the grouping is required, no further recordings will be made on the card in the machine but that card will be taken out of the machine and a new card brought into position. Hence, in preparing the cards the operator may, if desired, make the recordings indicating the groupings merely in the bottom row of recordings on the card.

Figures 6, 7, 8, 9, 10:
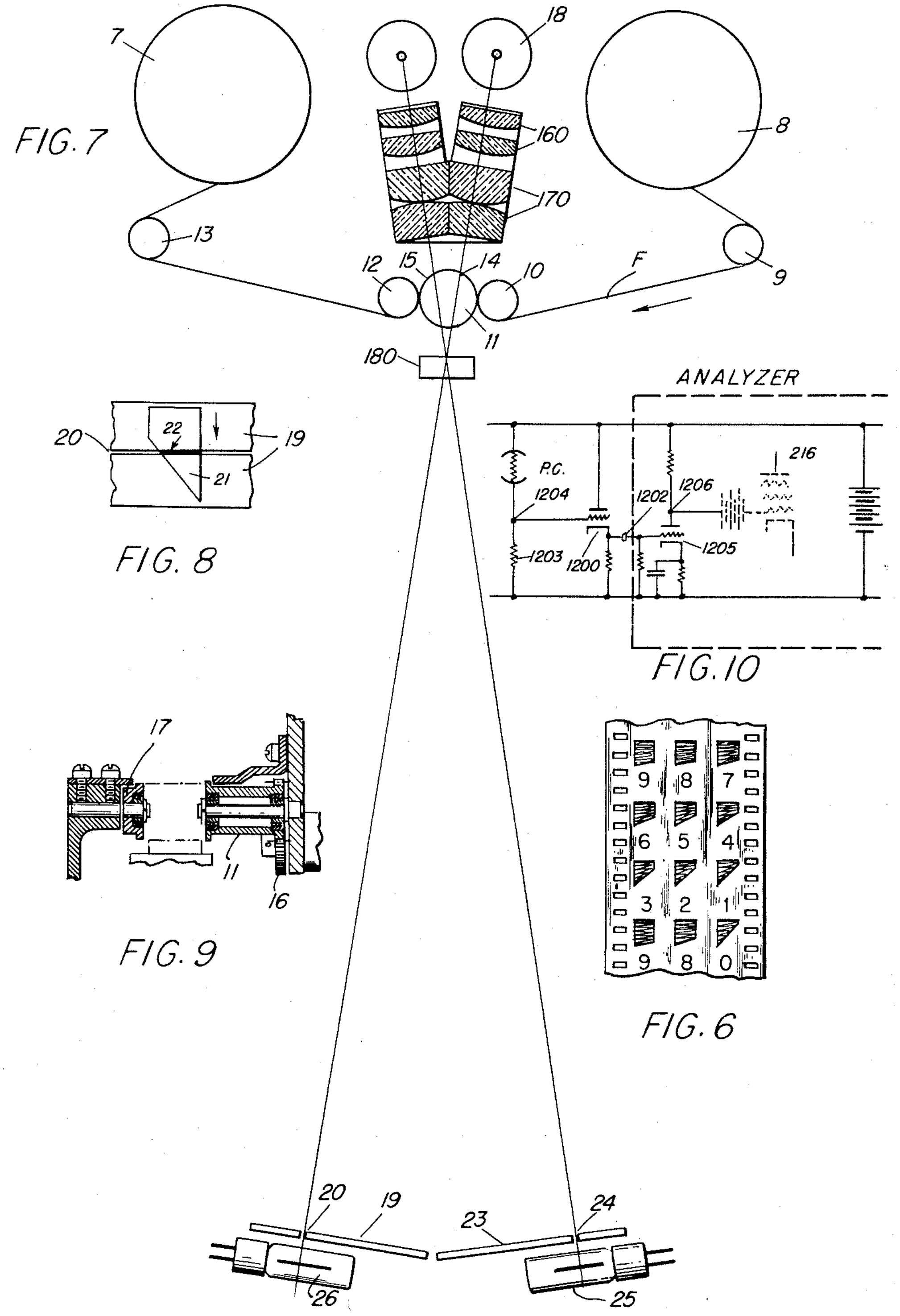

Instead of using the above-described instrumentalities of prior machines I may in carrying out my new method of operation provide for a comparison between the recordings in two successive rows of the same card or other media, for example, a continuous film such as illustrated in Fig. 6 of the drawings. In such case the spacing of the rows of sensing coils, the spacing of the recordings on the card, film or other medium, and the rate of movement of the medium bearing the recording past the sensing coils are so coordinated that the time between the pickup by the coils connected with the comparing instrumentalities and the pick-up by the coils for sensing the recorded numerical values to be transmitted to the register orders is sufficient for the desired operations to take place.

Figure 4:
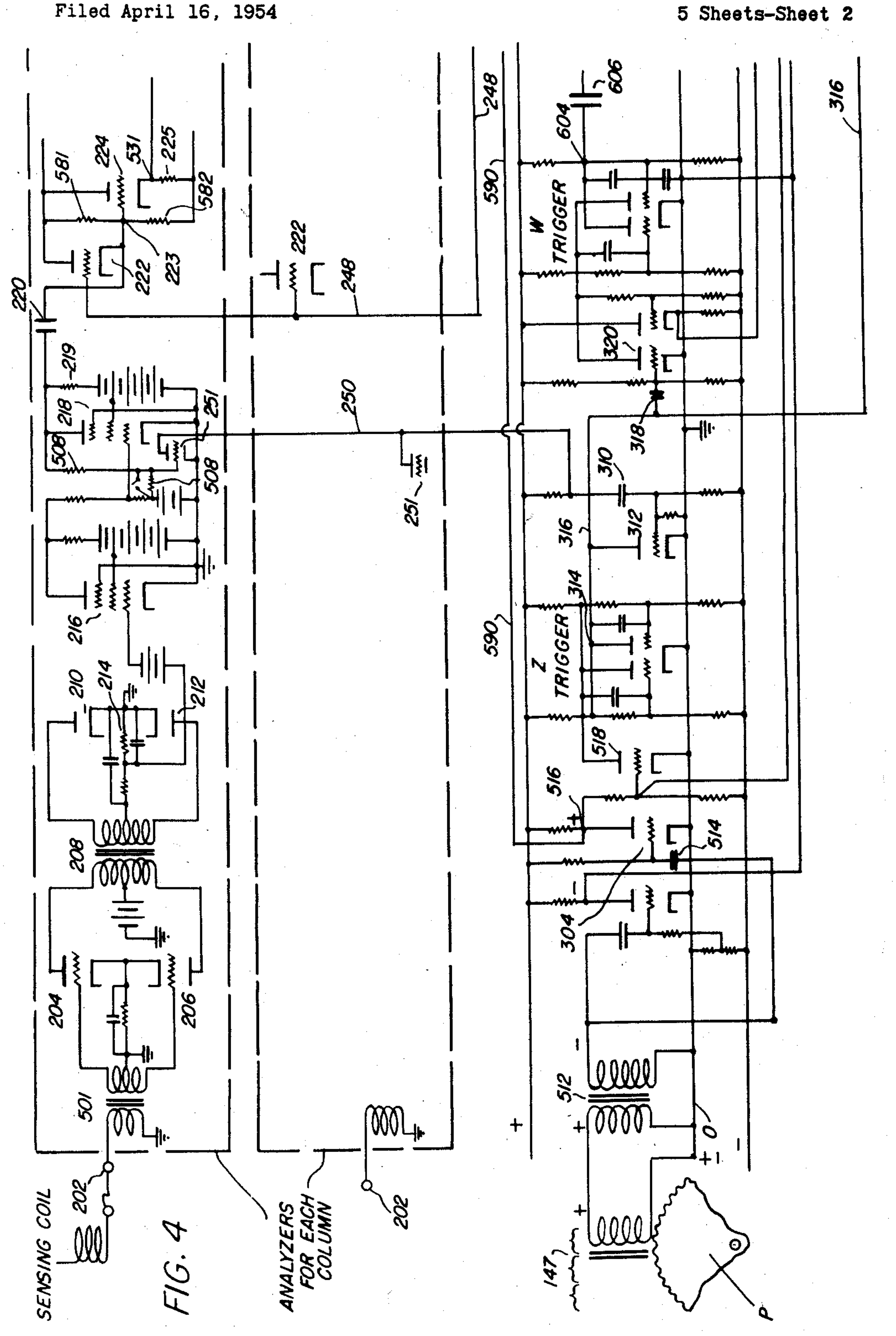
Fig. 4 is a schematic layout showing in detail one "analyzer" section and the control section of the computing machine.
Figure 4:
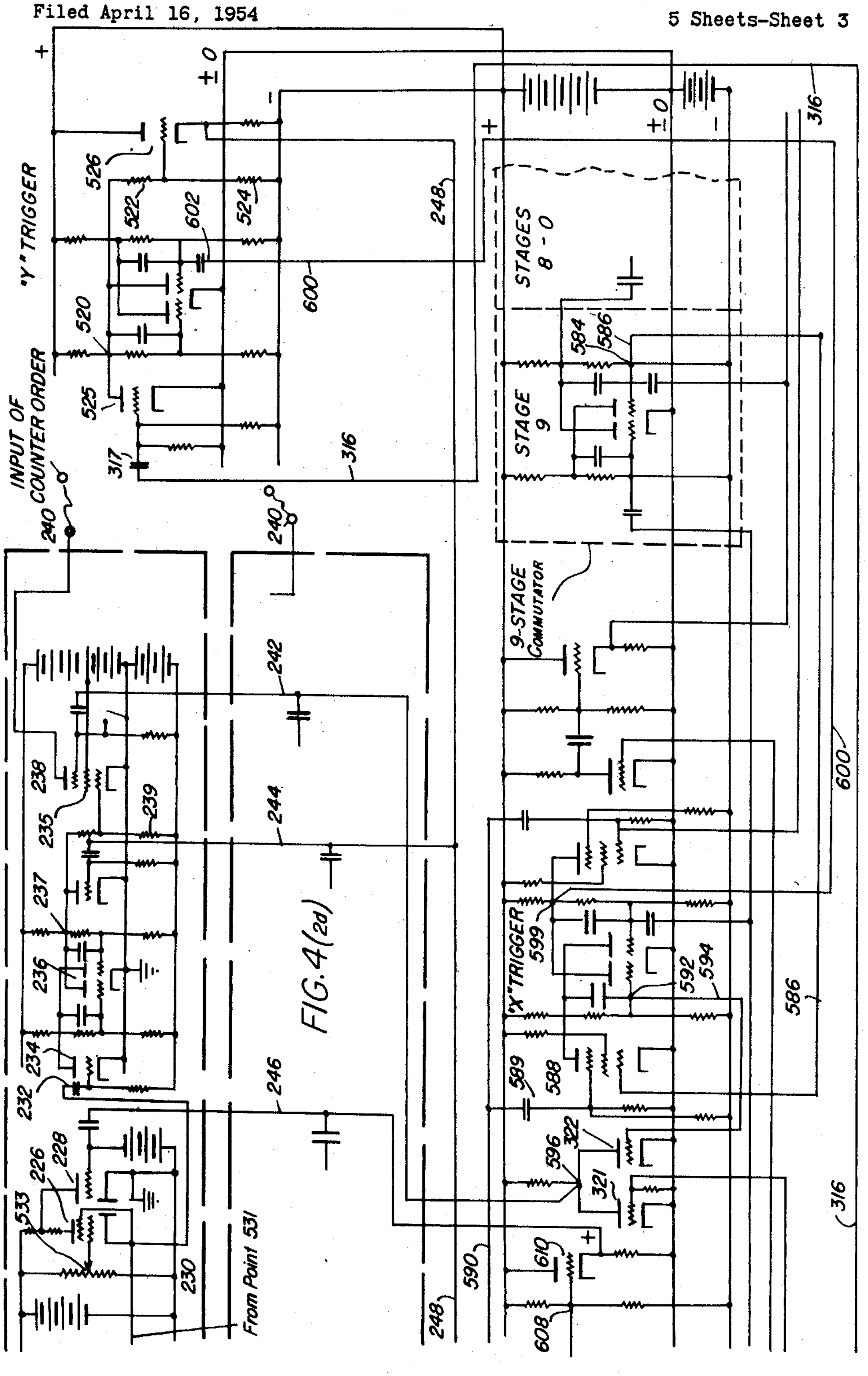

In Fig. 4 I have shown all the components of one analyzer section and also the components of the various triggers and other instrumentalities making up the control circuits. These instrumentalities for the most part involve no novelty per se and I have therefore in the following description mentioned specifically only such parts as are required for the sequence of operations in accordance with my new method to be fully understood.

Figure 5:
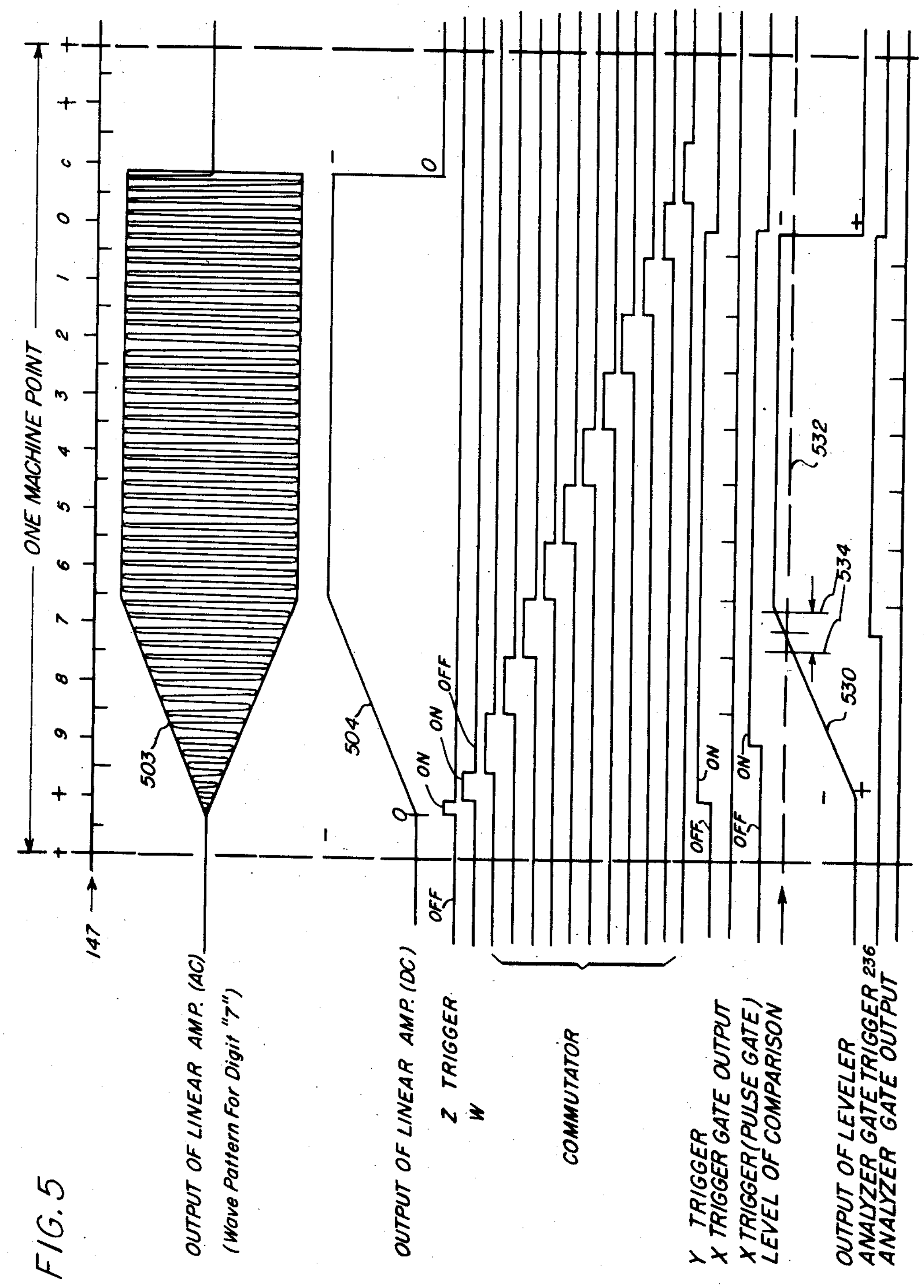
Fig. 5 is a time chart showing the sequence of operations of the machine during one "machine point" as modified to respond to the magnetic recordings in accordance with my new method of operation.

Referring to Fig. 4, the terminal of the analyzer section to which the sensing coil is connected is indicated at 202. This terminal is connected to the primary of a transformer 501, and the envelope of A.C. voltage from the pick-up coil is impressed across the primary of this transformer during the interval of passage of the magnetized area of the card, which is indicated in Fig. 5 by wave pattern 503. The secondary of this transformer is an input source for a push-pull class A amplifier comprising triodes 204 and 206. This is a well known type of amplifier and need not be further described.

The output voltage of this amplifier appears across the secondary of transformer 208 and is an exact replica of that detected by the sensing coil except for greater amplitude. The output of this amplifier is applied to a double diode full wave detector comprising diodes 210 and 212. The D.C. component of the wave pattern 503 is thus caused to appear in resistor 214 of the wave detector. This D.C. component is then amplified by a two-stage D.C. linear amplifier composed of pentodes 216 and 218 and as amplified appears across resistor 219. The amplified D.C. component of wave pattern 503 is represented in Fig. 5 at 504. It will be noted that the sense of 504 is inverted, that is, the negative is on top.

The junction of a voltage divider 506, 508 is connected to the grid of triode 251. The voltage divider is connected between the plate of pentode 218 and a suitable bias supply 221. Triode 251 is a sharp cut-off triode and is normally conductive when there is no signal impressed on the input terminal 202. However, as soon as a small voltage is detected, triode 251 becomes nonconductive. The triodes 251 for all sensing coils may be connected to a common line 250.

When triodes 251, which are connected to line 250, have all been made nonconductive, the potential of line 250 rises. A positive pulse from this line is applied through condenser 310 to the grid of triode 312. Conduction of triode 312, during this positive impulse, causes the "Z" trigger to switch from its "Off" to its "On" status.

A continuous train of impuses 147, Fig. 4, and Fig. 5, is produced by magnetic recordings made on a continuously rotating disc P. The next positive impulse 147, occurring after "Z" was switched on, has an effect as follows: the positive impulse 147 is inverted in transformer 512 and is applied as a negative pulse through condenser 514 to the grid of triode 304. This negative impulse on the grid causes momentary cut-off of triode 304 and a positive pulse is produced at point 516. The resulting momentary conduction of triode 518 causes the "Z" trigger to switch off (at time shown on Fig. 5).

When the "Z" trigger switches off, two triggers, namely a "W" trigger and a "Y" trigger, are switched on. The positive rise of point 314 when "Z" switches off is applied via wire 316 through condenser 318 to the grid of triode 320. The resulting momentary conduction of triode 320 causes the "W" trigger to switch on. This trigger, when switched off by the next negative pulse 147 (see Fig. 5) starts the aforementioned commutator by switching on its —9— stage. This commutator is caused to advance —8—, —7—, —6—, etc. by means of successive negative pulses 147. This commutator is a well-known type in which any stage "On" is turned "Off" by means of a common pulse line. As each stage is turned "Off" it turns "On" a succeeding stage. The successive stages of the commutator are shown in Fig. 5.

The "Y" trigger controls the operation of a "leveler" circuit. The leveler circuit functions to correct for irregularities in recording or misalignment in card feeding, and will be more fully explained later. The output of pentode 218 is applied to the input of the leveler circuit comprising tubes 222 and 224 through condenser 220. The output of the leveler appears across resistor 225 and is a replica of the output of pentode 218 with corrections made for early or late registration. The voltage across resistor 225 is then "compared" against a fixed standard by means of a comparing circuit comprised of thyratron 226 and triode 228. The output of the comparing circuit is in the form of a differentially timed impulse produced by firing of the thyratron 226. The sharp positive rise of point 230 when thyratron 226 fires is impressed on the normally negative grid of triode 234 through the condenser 232. The effect of this pulse is to switch on a trigger comprised of double triode 236. While this trigger is on it maintains open a gate, pentode 238, thereby permitting input pulses to be produced at the input of a counter unit of the computing section of the machine connected to the output 240 of the analyzer section. The number of pulses produced will correspond to the value of the magnetic recording. The source of these pulses is the pulse generating disc "P." They are produced in synchronism with card movement and are applied to wire 242 through a gating means described later. Other control lines used in this section are wire 244 which closes the gate 238, wire 246 which restores the thyratron 226 to its off status, wire 248 which controls the leveler circuit and wire 250 which is used for timing, as above described.

The "Y" trigger is also switched on when the "Z" trigger switches off, as follows: the rise of wire 316 effects a positive pulse through condenser 317 to the grid of triode 525. While the "Y" trigger was off, its point 520 was high and consequently the cathode of cathode follower triode 526 was also high. The grid of triode 526 is connected through voltage divider 522, 524 to the 520 point. Thus it may be seen that the potential of wire 248 is relatively high and conduction of triodes 222 in each analyzer section is at a maximum. A point 223 in the cathode circuit of triode 222, were it not for conduction in 222, would follow the excursions of the plate of pentode 218. For example, as the plate of pentode 218 becomes less positive, at a given rate, point 223 would also decrease in potential at that same rate. Resistors 581 and 582 are of very high resistance and condenser 220 is of such value that the time constant in this circuit is relatively long with respect to the slopes of the recorded digits. Since wire 248 is at a high potential conduction through triode 222 prevents any change in potential of point 223 even though the anode potential of pentode 218 decreases.

Now, however, when the "Y" trigger switches on, point 520 drops to a lower potential. Due to the decreased conduction through triode 526, the cathode of this triode becomes negative with respect to ground. Wire 248, now negative, no longer causes conduction of triodes 222 in the analyzer sections. Point 223 on voltage divider 581, 582 now follows the excursions of the plate of pentode 218. Point 531 of cathode follower 224 also begins to drop in potential at a rate established by the recorded voltage (see line 530, Fig. 5). Thus, it may be seen although the output of the linear D.C. amplifier is controlled solely by the magnitude of the recorded signal, a secondary control voltage (output of leveler—line 530, Fig. 5) is produced which has a fixed starting point and is controlled only in its rate of change by the record signal. Where variations in registration occur, due to card misalignment or improper recordings, corrections are made by means of this leveler circuit. This circuit is the subject of a separate application filed concurrently herewith, and will be more fully explained therein. Assume that the commutator has advanced from —9—, —8—, to —7— and is now midway in the seven time interval. Reference to line 530, Fig. 5, illustrates that, at this midpoint in the seven time, the output of the leveler has reached a point near its maximum negative shift. The leveler output, point 531, is connected to point 230 at the cathode of thyratron 226. Initially, point 230 is raised in potential to such an extent that thyratron 226 does not fire—its grid is considerably less positive than its cathode. However, as points 531 and 230 become increasingly less positive, a level is reached at which the thyratron will ignite. This is referred to as the "level of comparison" and, obviously, may be adjusted by potentiometer 533, Fig. 2*d*. The level of comparison is graphically shown on Fig. 5 as dashed line 532. Thus it may be seen that the potential of point 230 decreases (in this illustration) until it reaches the level of comparison midway in the —7— time. This is the ideal situation, however, and limits of variation during which the intersection of lines 530 and 532, Fig. 7 may occur are marked off by lines 534.

When thyratron 226 ignites, the increased current flow through resistor 225 causes an abrupt positive change in potential of points 531, 230. Point 230 is connected through condenser 232 to the grid of triode 234. The resulting momentary conduction of this triode causes trigger 236 to switch on. The #1 grid of pentode 238 is connected through voltage divider 235, 239 to point 237, and since this point is now raised, the #1 grid changed from cut-off to zero bias. The gate is now said to be open and positive pulses on wire 242 produce negative impulses in the anode circuit of this tube. The gate is opened midway in the seven time. Two impulses have already been applied to grid #3 with no effect. There remain seven impulses yet to appear on wire 242 and these will be applied to the input of the counter order. The nine impulses on wire 242 were produced as follows: when the nine stage in the commutator turned on, its point 584 was zero biased. Via wire 586, grid #1 of pentode 588 then is also zero biased. The positive impulse 147, occurring midway in the —9— time, is applied from point 516 over wire 590 through condenser 589 to the #3, normally cut-off, grid of pentode 588. This impulse is now effective in switching the "X" trigger on. With "X" on, point 592 is highly negative. This point connects via wire 594 to the grid of triode 322. Thus it may be seen that as long as "X" is off triode 322 conducts preventing any rise of point 596. Negative impulses 147 are continuously being applied to the grid of triode 321 and this triode becomes momentarily nonconductive for each such pulse. When "X" is on, as is now the case, triode 322 is nonconductive and a positive impulse is produced on wire 242 for each negative pulse 147. The "X" trigger remains on as the commutator advances until midway in the zero time. At that time it is caused to switch off, under control of the zero stage, in the same manner as it was switched on during the nine time.

When "X" switches off, point 599 drops in potential. This negative shift is applied via wire 600 through condenser 602 to the "Y" trigger to switch it off also. When "Y" switches off, the potential of wire 248 is again raised and, as is now understood, point 223 is also raised and held at a fixed high potential. Thyratron 226 remains fired. It is extinguished at the beginning of an analyzing period when the "W" trigger, previously described, switches on. Point 604 rises and a positive pulse is applied through condenser 606 to the grid connection 608 for an impedance matching triode 610. The cathode of this triode thus receives a positive impulse each time the "W" trigger switches on. This impulse, now on wire 246, causes momentary conduction of triode 228. The anode-cathode potential of the thyratron is thus reduced to such an extent that it extinguishes.

When the zero time in the commutator terminates, a carry time ("c" in Fig. 5) is initiated. However, as the computing and printing sections, including the "carry" devices, of the machine require no modification to perform in accordance with my new method of operation, these sections, as stated above, have not been shown in the drawings.

It will be understood that the operations above described take place with respect to each magnetic recording during its passage across the sensing head corresponding to the particular column at which the recording appears, and are repeated if both sensing heads are connected to analyzers as is required for some operations. There is, as stated above, a separate analyzer section for each sensing head whose responses are to be utilized. Thus, with thirty sensing heads in each row and thirty or more analyzer sections, the analyzer sections may be selectively coupled to the recording heads in the different rows so as to utilize as many of the columns on the card as necessary for the "grouping," "add-subtract" setting and other operations which precede the actual accounting operation.

It is believed that the modifications required in the accounting machine of the type above described in order for it to be utilized in carrying out my improved method of operation will be fully understood from the foregoing description. The same machine may with slight alteration be utilized for carrying out my improved method of operation with photographically produced symbols giving different responses when applied to light-sensitive instrumentalities such as the conventional photoelectric cell, and in Figs. 6 to 10, inclusive, I have illustrated an apparatus for utilizing a record of this character in a manner to obtain predetermined quantitative responses from photoelectric cells and utilizing such responses in an accounting machine of the kind described.

The photographic images employed in lieu of the magnetic recording are shown in Fig. 6. A method and apparatus for producing such images is disclosed in an application filed concurrently herewith. The film section shown carries images for three orders, the numbers selected being in the direction of film travel 987, 654, 321 and 098. It will be observed that the images representing the several digits differ from one another in a manner similar to the wave envelopes representing the magnetic recording shown in Fig. 2, that is to say, the image for digit "9" is of trapezoidal configuration with its leading edge at a small angle to the horizontal and the leading edge of the image for each succeeding lower digit has its lower edge at an increasingly greater angle. The responses produced in the photoelectric cells are of increasing intensity, the rate of increase being proportional to the "slant" of the leading edge of the image, as will now be described.

Fig. 7 is a diagrammatic showing of the principal parts of a projector unit required for sensing the data on the film. In general, as shown in Fig. 7, the film F comes from the supply reel 8, around idler pulley 9, under idler pulley 10, over sprocket 11, under idler pulley 12, around idler pulley 13, and is wound up on the take-up reel 7.

As shown in Fig. 9, the right end of sprocket 11 has an integral gear portion which meshes with a gear 16 on the drive shaft which is driven continuously. The left end of sprocket 11 has projecting teeth which engage the perforations in the film on one side only. The film, as it goes around the sprocket 11, is supported on one side by the sprocket 11 and on the other side by a roller 17 which is axially in line with sprocket 11 and the same diameter. The center portion of the film is thus unobstructed and light can be directed through the film as will be later explained. As the film describes a curved path around sprocket 11 and the roller 17, the film is rigid and does not tend to buckle in the center.

As the film passes over sprocket 11 (Fig. 7), a point on the film first passes the position 14 which corresponds to the upper sensing coil, and later advances to position 15. This corresponds to the lower sensing coil station.

Light from a concentrated arc light 18 is condensed into a line of light across the film at the position 14 by means of two cylindrical lenses 160 and two spherical lenses 170. The position 14 is imaged by the projection lens 180 on a mask 19 containing a slit 20 through which a portion of the projected image may pass to the photocell 26 immediately behind the mask. The quantity of light thus received by the photocell depends on the position of the projected image with respect to the slit. See Fig. 8. In this figure the projected image 21 (illuminated) falls across the slit 20 and the area 22 represents the light falling on the photocell beneath the opaque mask 19. It may be seen as the image moves in the direction of the arrow of light falling on the photocell will increase at a rate which represents the digit value. Similarly the image on the film in passing point 15 is projected on the mask 23 and then passes through the slit 24 and falls on the photocell 25 in the row corresponding to the second row of sensing coils above described. It will be understood that there are one photocell 26 and one photocell 25 for each column of images on the film.

Fig. 10 shows the changes required in the analyzer section of the machine for it is to respond to the voltages induced in the photocells. The photocell is indicated at P.C. Since the photocell is inherently a high impedance device, an impedance transformer in the form of cathode follower 1200 is employed. The individual outputs of the photocells are brought to the contacts 1202 through this device for elimination of crosstalk. The value of resistor 1203 is selected to give the optimum linear output from the photocell. As the intensity of light on the photocell P.C. increases, its internal resistance decreases causing point 1204 to rise. A corresponding rise also appears at contact 1202. The grid of triode 1205 thus responds to the variations in light intensity sensed by the photocell. Triode 1205 amplifies and inverts the D.C. signal from the photocell and point 1206 is connected through a suitable biasing means to the grid of pentode 216. From point 1206 on, the circuits are identical with those above described. The image for digit 7 in the units column of the first number will produce an inverted D.C. signal corresponding exactly with line 504 of Fig. 5.

The specific embodiments of the invention herein described may of course be variously modified in carrying out my improved method of operation the essential features of which are the provision of recordings which give different responses by virtue of their inherent characteristics and not by virtue of their position on the medium carrying the recordings, and an apparatus for utilizing such recordings for accounting and like purposes of the type wherein recordings having significance by virtue of their position on the recording medium have heretofore been used. It is to be understood, therefore, that the invention is not limited to the specific embodiments disclosed, but includes all such modifications thereof as fall within the scope of the appended claims.

I claim:

1. In machines having accumulators responsive to repeated electric impulses, control circuits, means for producing in said circuits currents of increasing intensity from a predetermined low voltage to a predetermined higher voltage, means for generating a predetermined number of timed electric impulses in successive cycles, means for connecting said impulse generating device to said accumulators when the current in the control circuit of the accumulator reaches a predetermined intensity between the predetermined low voltage and the higher voltage whereby the number of impulses delivered to the accumulators in a given cycle may be varied by varying the pattern of increasing intensity of the control circuits.

2. In machines having accumulators responsive to repeated electric impulses, control circuits having sensing devices, means for advancing a record medium having discrete areas conditioned to produce in said control circuit during the movement of the record medium past said devices, responses of predetermined patterns of increasing intensity, means for generating a series of timed electric impulses during the passage of said areas across said sensing devices, and means for connecting said impulse generating device to said accumulators when the response in the control circuit for the accumulator reaches a predetermined intensity whereby the number of impulses delivered to the accumulator is determined by the pattern of increasing intensity of the response.

3. In electronic machines having accumulators responsive to successively applied electric impulses, means for successively generating repeated sequences of such impulses, and means for controlling the number of impulses of each sequence applied to said accumulators which comprises control circuits including means responsive to an electromotive force of low intensity for initiating the sequence of timed impulses, means responsive to an electromotive force of higher intensity for connecting said impulse generator to said accumulators, and means for applying to said control circuits a current of increasing voltage whereby the number of impulses delivered to the accumulators is determined by the pattern of voltage increase.

4. In machines having accumulators responsive to successively applied electric impulses, an analyzer section for controlling the entry of impulses in said accumulators, said analyzer section comprising a control circuit including a magnetic pick-up, a commutator for controlling the transmission of actuating impulses to the accumulators, a trigger responsive to low voltage currents for initiating a commutator cycle, a second trigger responsive to currents of high voltage for connecting said commutator, and means for feeding past said pick-up mechanism record sheets having magnetized areas of a character to induce in the pick-up circuit currents of increasing voltage.

5. Character identifying apparatus comprising means for sensing a character recording on a record member and producing an output signal having a wave shape determined by the configuration of the character recording, means for storing said output signal, means for comparing the amplitude of the output signal with the amplitude of a reference signal and producing a resultant signal, and means responsive to the time location of said resultant signal within the duration of said wave for identifying the character sensed.

6. Character identifying apparatus comprising means for sensing character recordings on a record member and producing output signals having wave amplitude-time relations between leading and trailing wave ends determined by the configurations of the character recordings, and means for identifying the characters from the sensing means output signals including means responsive to the locations, with respect to one of said wave ends, of portions of said waves exceeding a predetermined threshold amplitude for producing signals, and means responsive to the time of occurrence of said signals with respect to one of said wave ends for providing character identification.

7. Character identifying apparatus comprising means for sensing character recordings on a record member and producing output signals having predetermined amplitude values at time locations between leading and trailing wave ends determined by the configurations of the character recordings, and means responsive to the time location with respect to one of said ends of portions of said waves exceeding a predetermined threshold amplitude for identifying the characters from the sensing means output signals.

8. Character identifying apparatus in accordance with claim 7 in which the configuration of the character recording is an area configuration.

9. Character identifying apparatus in accordance with claim 7 in which the output signal is an electrical signal and in which the configuration of the character recording is an electrical configuration.

10. Character identifying apparatus in accordance with claim 7 in which the output signal is an electrical signal and in which the configuration of the character recording is a magnetic configuration.

References Cited in the file of this patent

UNITED STATES PATENTS

| | | |
|---|---|---|
| 2,224,646 | Friedman et al. | Dec. 10, 1940 |
| 2,268,434 | Tauschek | Dec. 30, 1941 |
| 2,272,366 | Dickinson | Feb. 10, 1942 |
| 2,308,928 | Maul | Jan. 19, 1943 |
| 2,343,370 | Dickinson | Mar. 7, 1944 |
| 2,362,004 | Heidinger | Nov. 7, 1944 |
| 2,401,021 | Rosenberg et al. | May 28, 1946 |
| 2,750,113 | Coleman | June 12, 1956 |